US009641435B1

(12) United States Patent
Sivaramakrishnan

(10) Patent No.: US 9,641,435 B1
(45) Date of Patent: May 2, 2017

(54) PACKET SEGMENTATION OFFLOAD FOR VIRTUAL NETWORKS

(71) Applicant: Juniper Networks, Inc., Sunnyvale, CA (US)

(72) Inventor: Rajagopalan Sivaramakrishnan, Sunnyvale, CA (US)

(73) Assignee: Juniper Neworks, Inc., Sunnyvale, CA (US)

( * ) Notice: Subject to any disclaimer, the term of this patent is extended or adjusted under 35 U.S.C. 154(b) by 205 days.

(21) Appl. No.: 14/228,844

(22) Filed: Mar. 28, 2014

(51) Int. Cl.
*H04L 12/741* (2013.01)
*H04L 29/06* (2006.01)
*H04L 12/721* (2013.01)
*H04L 12/713* (2013.01)

(52) U.S. Cl.
CPC .......... *H04L 45/745* (2013.01); *H04L 45/586* (2013.01); *H04L 45/66* (2013.01); *H04L 69/166* (2013.01)

(58) Field of Classification Search
None
See application file for complete search history.

(56) References Cited

U.S. PATENT DOCUMENTS

| 7,184,437 | B1 | 2/2007 | Cole et al. | |
|---|---|---|---|---|
| 2011/0078782 | A1* | 3/2011 | Chan | H04L 63/0209 726/13 |
| 2012/0250530 | A1* | 10/2012 | Jagadeeswaran | H04L 43/08 370/252 |
| 2013/0242983 | A1* | 9/2013 | Tripathi | H04L 49/25 370/355 |
| 2014/0195666 | A1* | 7/2014 | Dumitriu | H04L 12/4625 709/223 |
| 2014/0269705 | A1* | 9/2014 | DeCusatis | H04L 45/52 370/390 |
| 2015/0081863 | A1* | 3/2015 | Garg | H04L 41/00 709/223 |

FOREIGN PATENT DOCUMENTS

WO 2013184846 A1 12/2013

OTHER PUBLICATIONS

U.S. Appl. No. 14/226,509, filed Mar. 26, 2014 entitled Tunneled Packet Aggregation for Virtual Networks.
U.S. Appl. No. 14/226,549, filed Mar. 26, 2014 entitled Receive Packet Steering for Virtual Networks.
U.S. Appl. No. 14/226,586, filed Mar. 26, 2014 entitled Proactive Flow Table for Virtual Networks filed Mar. 26, 2014
U.S. Appl. No. 61/926,079, filed Jan. 10, 2014 entitled Enhanced Virtual Router for Software-Defined Networks.

\* cited by examiner

*Primary Examiner* — Noel Beharry
*Assistant Examiner* — Wilfred Thomas
(74) *Attorney, Agent, or Firm* — Shumaker & Sieffert, P.A.

(57) ABSTRACT

In one example, a server executes a virtual router configured to receive an inner packet output by a virtual machine associated with a virtual network. The virtual router is further configured to offload, to a physical network interface card of the server that executes the virtual router, segmentation of the inner packet into a plurality of outbound tunnel packets each having a tunnel header for output by the physical network interface card to a physical network underlying the virtual network.

16 Claims, 6 Drawing Sheets

PACKET SEGMENTATION OFFLOAD FOR VIRTUAL NETWORKS

TECHNICAL FIELD

Techniques of this disclosure relate generally to computer networks and more particularly to virtual networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of a data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities. Data centers tend to use switching components that switch packets conforming to packet-based communication protocols such as Transmission Control Protocol over Internet Protocol (TCP/IP).

Network devices that use TCP/IP to exchange packets may use large segment offload (LSO) to offload, to a co-processor of the central processing unit (CPU) that otherwise executes the TCP/IP stack, the segmentation of relatively large data chunks into smaller segments to be transported via a network. Network interface cards (NICs) have been developed to enable the offloading of TCP segmentation by the CPU of a network device to logic executing on a NIC that sends and receives packets for the network device. That is, rather than the CPU performing TCP segmentation, the CPU may direct the NIC to perform TCP segmentation of a large TCP segment (or some other chunk of data) in accordance with a template provided by the CPU executing the network stack. This is a variant of LSO and is referred to as TCP segmentation offload or transport segmentation offload (TSO). Other terms include Generic Segmentation Offload (GSO).

SUMMARY

In general, techniques are described for enhancing operations of virtual networks. A plurality of servers is interconnected by a physical network formed by a plurality of switches, and each of the servers provides an operating environment executing one or more virtual machines in communication via an overlay network operating over the physical network. A set of virtual routers operating within the servers and/or other devices of the physical network extends the overlay network as a virtual network to the operating environment of the virtual machines.

A virtual router executes multiple routing instances for corresponding virtual networks. Each virtual network interconnects multiple virtual routers collectively implementing the virtual networks. Tunnel packets received by the virtual router from the underlying physical network fabric may include an outer header to allow the physical network fabric to tunnel the payload or "inner packet" to a physical network address for a network interface of the server that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conforms to the virtual network addressing space for the virtual network identified by the virtual network identifier.

In some examples, the virtual router extends segmentation offload techniques to offload data segmentation to a network interface card (NIC) to generate multiple tunnel packets for a virtual network and transportable by a physical network. For instance, the virtual router receives a packet transmitted by a virtual machine to which the virtual router extends a virtual network, where packet data from the packet is to be encapsulated within one or more tunnel packets as an "inner" packet. After determining an outer header for the inner packet using a corresponding routing instance for the virtual network, the virtual router may direct the NIC to individually encapsulate a plurality of equal-sized segments of the packet data of the inner packet to be generated and packetized with the same, determined outer header, thus producing a corresponding plurality of tunnel packets having identical outer headers for transmission by the NIC on the physical network. The virtual router may also direct the NIC to generate a separate tunnel packet with which to encapsulate and forward any remainder of the packet data of the inner packet separately from the plurality of equal-sized segments. In this way, the virtual router offloads, to the NIC, segmentation of the inner packet for transmission by the NIC on the physical network, which may reduce packet processing overhead at the virtual router, even though the inner packet is to be segmented and forwarded using a plurality of tunnel packets. That is, by utilizing NIC capabilities to segment the inner packet, the techniques may reduce the amount of processing resources that would otherwise be used by the virtual router to perform the segmentation.

In one example, a method includes receiving, by a virtual router for one or more virtual networks, an inner packet output by a virtual machine associated with a virtual network from the one or more virtual networks. The method also includes offloading, by the virtual router to a physical network interface card, segmentation of the inner packet into a plurality of outbound tunnel packets each having a tunnel header for output by the physical network interface card to a physical network underlying the virtual network.

In another example, a network system includes a switch fabric comprising a plurality of switches interconnected to form a physical network, a virtual network controller device configured to configure and manage one or more virtual networks within the physical network, and a plurality of servers interconnected by the switch fabric. Each of the servers comprises an operating environment executing one or more virtual machines in communication via the one or more virtual networks, and wherein the servers execute at least one virtual router configured to extend the one or more virtual networks to the operating environments of the virtual machines. A server of the plurality of servers executes a virtual router of the at least one virtual router. The virtual router is configured to receive an inner packet output by a virtual machine of the one or more virtual machines that is associated with a virtual network from the one or more virtual networks. The virtual router is also configured to offload, to a physical network interface card of the server that executes the virtual router, segmentation of the inner packet into a plurality of outbound tunnel packets each having a tunnel header for output by the physical network interface card to a physical network underlying the virtual network.

In another example, a non-transitory computer-readable medium comprises instructions for causing one or more programmable processors to receive, by a virtual router for one or more virtual networks, an inner packet output by a virtual machine associated with a virtual network from the one or more virtual networks and offload, by the virtual router to a physical network interface card, segmentation of the inner packet into a plurality of outbound tunnel packets each having a tunnel header for output by the physical network interface card to a physical network underlying the virtual network.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
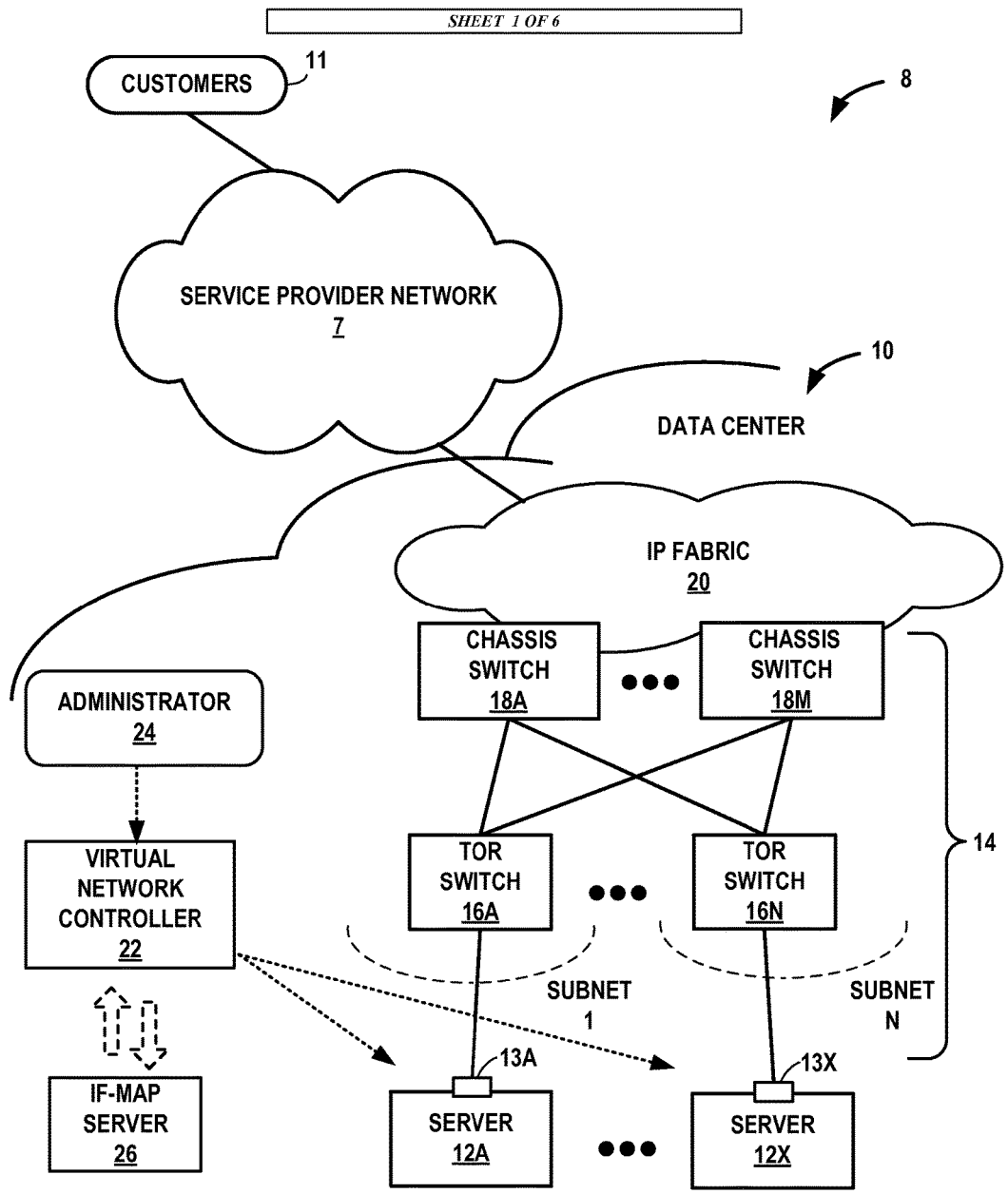
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") having respective network interface cards (NICs) 13A-13X and interconnected via high-speed switch fabric 14 provided by one or more tiers of physical network switches and routers. Switch fabric 14 is provided by a set of interconnected top-of-rack (TOR) switches 16A-16N (collectively, "TOR switches 16") coupled to a distribution layer of chassis switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provide high-speed connectivity between TOR switches 16. TOR switches 16 may be network devices that provide layer 2 (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 by service provider network 7.

Virtual network controller 22 ("VNC") provides a logically and in some cases physically centralized controller for facilitating operation of one or more virtual networks within data center 10 in accordance with one or more embodiments of this disclosure. In some examples, virtual network controller 22 may operate in response to configuration input received from network administrator 24. Additional information regarding virtual network controller 22 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS; U.S. patent application Ser. No. 14/226,509, filed Mar. 26, 2014, and entitled TUNNELED PACKET AGGREGATION FOR VIRTUAL NETWORKS; U.S. patent application Ser. No. 14/226,549, filed Mar. 26, 2014, and entitled RECEIVE PACKET STEERING FOR VIRTUAL NETWORKS; U.S. patent application Ser. No. 14/226,586, filed Mar. 26, 2014, and entitled PROACTIVE FLOW TABLE FOR VIRTUAL NETWORKS; and U.S. Patent Appln. No. 61/926,079, filed Jan. 10, 2014, and entitled ENHANCED VIRTUAL ROUTER FOR SOFTWARE-DEFINED NETWORKS; each of which is incorporated by reference as if fully set forth herein.

One or more of servers 12 may include a virtual router that executes multiple routing instances for corresponding virtual networks within data center 10. Packets received by the virtual router of server 12A, for instance, from the underlying physical network switch fabric 14 may include an outer header to allow the physical network fabric to tunnel the payload or "inner packet" to a physical network address for NIC 13A of server 12A that executes the virtual router. The outer header may include not only a physical network address of NIC 13A of the server 12A but also a virtual network identifier such as a VxLAN tag or Multi-protocol Label Switching (MPLS) label that identifies one of the virtual networks as well as the corresponding routing instance executed by the virtual router. An inner packet includes an inner header having a destination network address that conforms to the virtual network addressing space for the virtual network identified by the virtual network identifier in the outer header.

In accordance with techniques described herein, the virtual routers executing on the servers 12 offload data segmentation to respective NICs to generate multiple tunnel packets, transportable by switch fabric 14, from inner packets for the virtual networks. For instance, the virtual router executing on server 12A receives an inner packet from a virtual machine (or separate host device connected to server 12A) to which the virtual router extends a virtual network. After determining an outer header for the inner packet using a corresponding routing instance for the virtual network, the virtual router executing on server 12A may direct the NIC 13A to individually encapsulate a plurality of equal-sized segments to be generated and packetized with the same, determined outer header, thus producing a corresponding plurality of tunnel packets having identical outer headers for transmission by the NIC 13A to TOR switch 16A for switching by switch fabric 14. The virtual router may also direct the NIC 13A to generate a separate tunnel packet with which to forward any remainder of the inner packet separately from the plurality of equal-sized segments. In this way, the virtual router offloads, to the NIC 13A, segmentation of the inner packet for transmission by the NIC 13A to switch fabric 14, which reduces packet processing overhead at the virtual router by one or processors of server 12A. That is, by utilizing capabilities of NICs 13A-13X, the techniques may reduce the amount of processing resources that would otherwise be used by servers 12 executing virtual routers to perform the segmentation.

Figure 2:
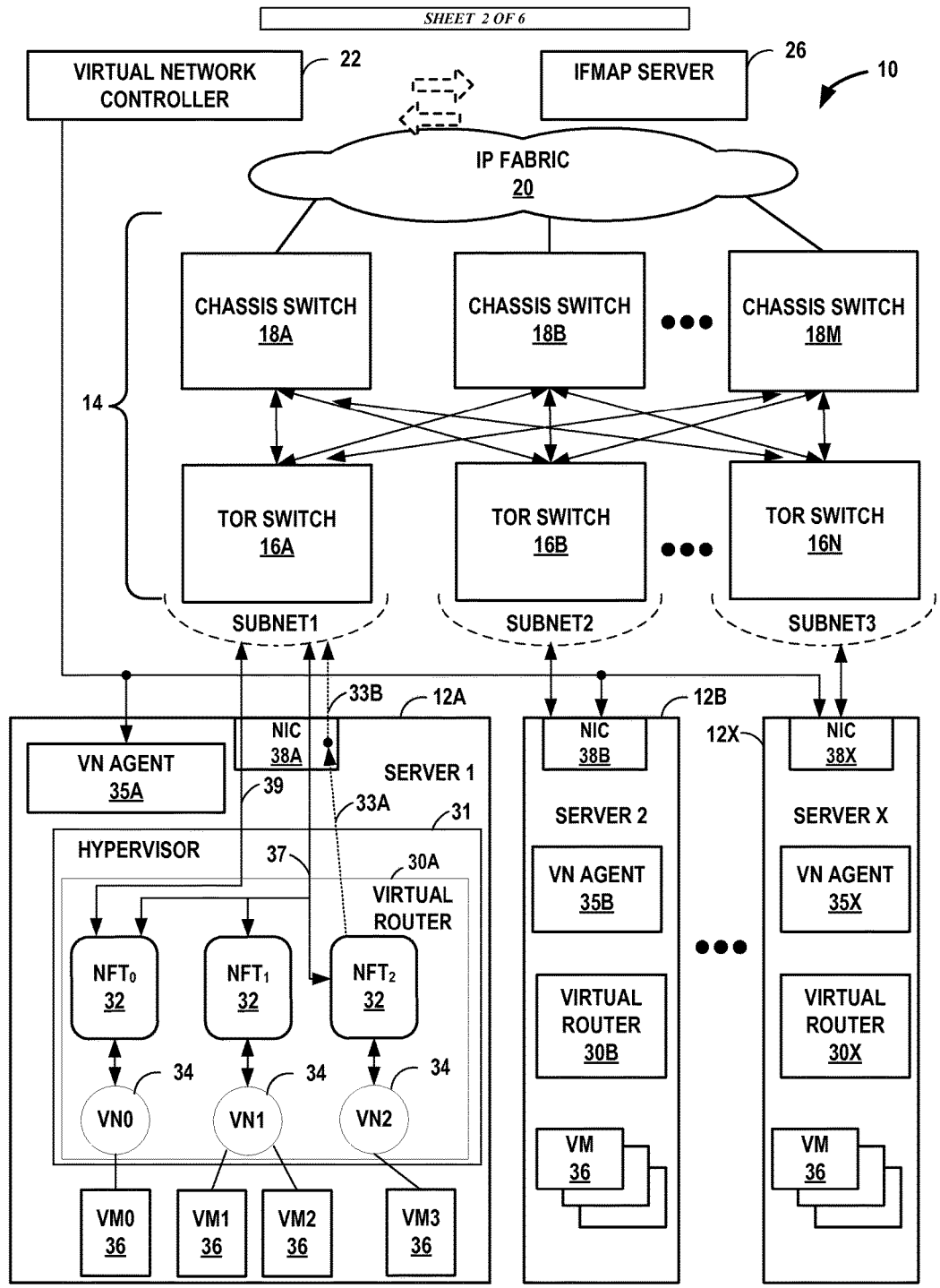
FIG. 2 is a block diagram illustrating an example implementation of the data center of FIG. 1 in further detail.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software or "virtual" switches 30A-30X (collectively, "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network.

Servers 12 each include one or more network interface cards (NICs). For purposes of illustration, servers 12 of FIG. 2 include respective NICs 38A-38X to exchange outer packets with TOR switches 16 of switch fabric 14. NICs 38A-38X may represent example instances of NICs 13 of FIG. 1. Each NIC of NICs 38 includes one or more physical interfaces (or "ports") that permit the NIC to communicate via a L2 connection. In general, NICs 38 include hardware circuitry or a combination of hardware circuitry and software to permit communication using a specific physical layer (L2) and data link (L2) standard such as Ethernet, Wi-Fi, or Token Ring, which provides the base for a full network protocol stack (e.g., Open Standard Interconnect (OSI) or TCP/IP) by which virtual routers 30 (and by extension VMs 36) may exchange inner packets and application data encapsulated therein.

Each virtual router 30 may execute within a hypervisor, a host operating system or other component of each of servers 12. Each of servers 12 may represent an x86 or other general-purpose or special-purpose server capable of executing virtual machines 36. In the example of FIG. 2, virtual router 30A executes within hypervisor 31, also often referred to as a virtual machine manager (VMM), which provides a virtualization platform that allows multiple operating systems to concurrently run on one of servers 12. In the example of FIG. 2, virtual router 30A manages virtual networks 34, each of which provides a network environment for execution of one or more virtual machines (VMs) 36 on top of the virtualization platform provided by hypervisor 31. Each VM 36 is associated with one of the virtual networks VN0-VN1 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines.

In general, each VM 36 may be any type of software application and may be assigned a virtual address for use within a corresponding virtual network 34, where each of the virtual networks may be a different virtual subnet provided by virtual router 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions, as well as other techniques described herein, may be performed at the edge of switch fabric 14 at a first-hop TOR switch 16 that is one hop removed from the application instance that originated the packet. This functionality is referred to herein as tunneling and may be used within data center 10 to create one or more overlay networks. Besides IPinIP, other example tunneling protocols that may be used include IP over GRE, VxLAN, MPLS over GRE (MPLSoGRE), MPLS over UDP, etc.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as one or more overlay networks of data center 10. Similarly, switches 16, 18 and virtual routers 30 maintain routing information, such as one or more routing and/or forwarding tables. In one example implementation, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

For example, virtual machine 36 VM1 sends a packet, an "inner packet," to virtual router 30A by an internal link, which may for instance be a shared memory reference/pointer, an internal signal, a message, a bus message, or a combination of the above. Virtual router 30A uses $NFT_1$ to look up a virtual network destination network address for the inner packet. $NFT_1$ specifies an outbound interface for virtual router 30A and encapsulation for the inner packet. Virtual router 30A applies the encapsulation to add a tunnel header to generate an outer or "tunnel" packet and outputs the tunnel packet on the outbound interface, in this case toward TOR switch 16A.

The routing information may, for example, map packet key information (e.g., destination IP information and other select information from packet headers) to one or more specific next hops within the networks provided by virtual routers 30 and switch fabric 14. In some case, the next hops may be chained next hop that specify a set of operations to be performed on each packet when forwarding the packet, such as may be used for flooding next hops and multicast replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of U.S. Pat. No. 7,184,437 being incorporated herein by reference in its entirety.

As shown in FIG. 2, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2, each virtual router 30 includes a default network forwarding table $NFT_0$ and provides a default route that allows a packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

Moreover, virtual network controller 22 and virtual routers 30 may communicate using virtual subnet VN0 in accordance with default network forwarding table $NFT_0$ 32 during discovery and initialization of the overlay network, and during conditions where a failed link has temporarily halted communication via the overlay network. Once connectivity with the virtual network controller 22 is established, the virtual network controller 22 updates its local routing table to take into account new information about any failed links and directs virtual routers 30 to update their local network forwarding tables 32. For example, virtual network controller 22 may output commands to virtual network agents 35 to update one or more NFTs 32 to direct virtual routers 30 to change the tunneling encapsulation so as to re-route communications within the overlay network, for example to avoid a failed link.

When link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information and may issue messages to other virtual network agents 35 to update local routing information stored by the virtual network agents within network forwarding tables 32.

In accordance with techniques described herein, virtual routers 30 executing on the servers 12 offload data segmentation to associated NICs 38A-38X to generate multiple tunnel packets, transportable by switch fabric 14, from inner packets for the virtual networks received from VMs 36. For instance, the virtual router 30A executing on server 12A receives an inner packet 33A from VM3 36. After determining an outer header for the inner packet using $NFT_2$ for the virtual network associated with VM3 36, the virtual router 30 may direct the NIC 38A to individually encapsulate a plurality of equal-sized segments to be generated and packetized with the same, determined outer header, thus producing a corresponding plurality of tunnel packets 33B having identical outer headers for transmission by the NIC 38A to TOR switch 16A for switching by switch fabric 14. The virtual router 30A may also direct the NIC 38A to generate a separate tunnel packet with which to forward any remainder of the inner packet 33A separately from the plurality of equal-sized segments. In this way, the virtual router 30 offloads segmentation of the inner packet 33A to NIC 38A, which reduces packet processing overhead at the virtual router 30A by one or processors of server 12A. Offloading segmentation of the inner packet 33A to NIC 38A may therefore reduce the amount of processing resources that would otherwise be used by server 12A executing virtual router 30 to perform the segmentation.

Figure 3:
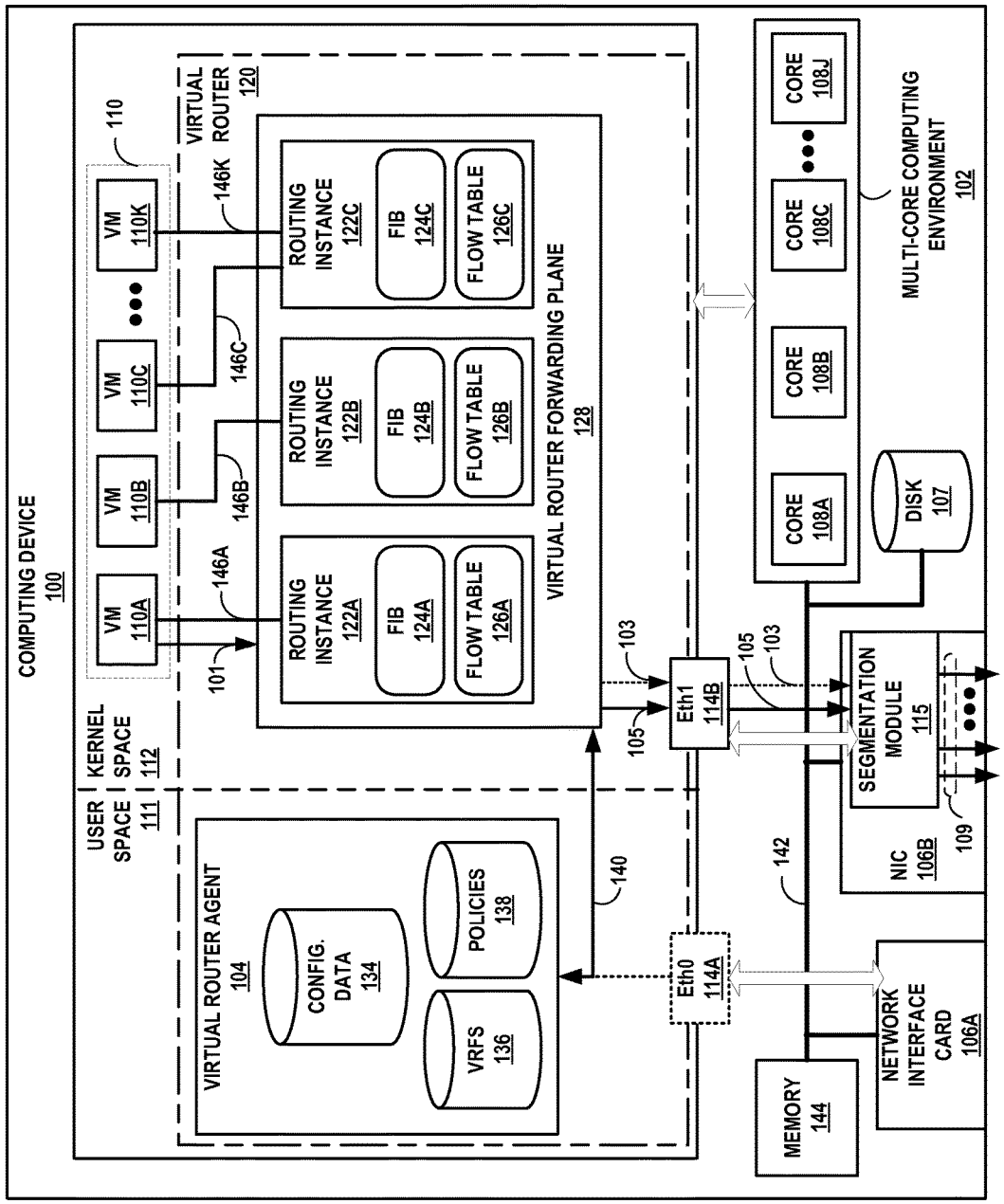
FIG. 3 is a block diagram illustrating a computing device that executes an example virtual router for virtual networks according to techniques described herein.

FIG. 3 is a block diagram illustrating a computing device that executes an example virtual router for virtual networks according to techniques described herein. Computing device 100 may represent any of servers 12 of FIGS. 1-2 or other device, such as any of TOR switches 16.

Computing device 100 includes in this example a bus 142 coupling hardware components of a computing device 100 hardware environment. Bus 142 couples memory 144, network interface cards (NICs) 106A-106B (collectively, "NICs 106"), storage disk 107, and multi-core computing environment 102 having a plurality of processing cores 108A-108J (collectively, "processing cores 108"). Bus 142 may represent PCI, PCIe/PCI-E, PCI-X, HyperTransport, Infiniband, I2C, or other types of bus operative to communicatively couple the NICs 106, processing cores, and/or memories. Bus 142 may be separated into a system bus and I/O bus. Network interface cards 106 each include interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 107 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108.

Memory 144, NICs 106, storage disk 107, and multi-core computing environment 102 provide an operating environment for a software stack that executes a virtual router 120 and one or more virtual machines 110A-110K (collectively, "virtual machines 110"). Virtual router 120 may represent an example instance of virtual router 30 of FIG. 2, and virtual machines 110 may represent example instances of any of virtual machines 36 of FIG. 2. The computing device 100 partitions the virtual and/or physical address space provided by main memory 144 and in the case of virtual memory by disk 107 into user space 111, allocated for running user processes, and kernel space 112, which is protected and generally inaccessible by user processes. An operating system kernel (not shown in FIG. 3) may execute in kernel space and may include, for example, a Linux, Berkeley Software Distribution (BSD), another Unix-variant kernel, or a Windows server operating system kernel, available from Microsoft Corp. Computing device 100 may in some instances execute a hypervisor to manage virtual machines 110 (also not shown in FIG. 3). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 124 may execute the virtual router 120.

Eth0 114A and Eth1 114B represent devices according to a software device model and provide device driver software routines for handling packets for receipt/transmission by corresponding NICs 106. Packets received by NICs 106 from the underlying physical network fabric for the virtual networks may include an outer header to allow the physical network fabric to tunnel the payload or "inner packet" to a physical network address for one of NICs 106. The outer header may include not only the physical network address but also a virtual network identifier such as a VxLAN tag or Multiprotocol Label Switching (MPLS) label that identifies one of the virtual networks as well as the corresponding routing instance 122. An inner packet includes an inner header having a destination network address that conforms to the virtual network addressing space for the virtual network identified by the virtual network identifier. For example, virtual router forwarding plane 128 may receive by Eth1 from NIC 106 a packet having an outer header than includes a VxLAN or MPLS label associated in virtual router forwarding plane 128 with routing instance 122A. The packet may have an inner header having a destination network address that is a destination address of VM 110A that taps, via tap interface 146A, into routing instance 122A. Each of VMs 110 includes at least one corresponding tap interface of tap interfaces 146A-146K to routing instances 122.

Virtual router 120 in this example includes a kernel space 112 module: virtual router forwarding plane 128, as well as a user space 111 module: virtual router agent 104. Virtual router forwarding plane 128 executes the "forwarding plane" or packet forwarding functionality of the virtual router 120 and virtual router agent 104 executes the "control plane" functionality of the virtual router 120. Virtual router agent 104 may represent an example instance of any of VN agents 35 of FIG. 2.

Virtual router forwarding plane 128 includes multiple routing instances 122A-122C (collectively, "routing instances 122") for corresponding virtual networks. Each of routing instances 122 includes a corresponding one of forwarding information bases (FIBs) 124A-124C (collectively, "FIBs 124") and flow tables 126A-126C (collectively, "flow tables 126"). Although illustrated as separate data structures, flow tables 126 may in some instances be logical tables implemented as a single table or other associative data structure in which entries for respective flow tables 126 are identifiable by the virtual network identifier (e.g., a VRF identifier such as VxLAN tag or MPLS label)). FIBs 124 include lookup tables that map destination addresses to destination next hops. The destination addresses may include layer 3 network prefixes or layer 2 MAC addresses. Flow tables 126 enable application of forwarding policies to flows. Each of flow tables 126 includes flow table entries that each match one or more flows that may traverse virtual router forwarding plane 128 and include a forwarding policy for application to matching flows. For example, virtual router forwarding plane 128 attempts to match packets processed by routing instance 122A to one of the flow table entries of flow table 126A. If a matching flow table entry exists for a given packet, virtual router forwarding plane 128 applies the flow actions specified in a policy to the packet. This may be referred to as "fast-path" packet processing. If a matching flow table entry does not exist for the packet, the packet may represent an initial packet for a new packet flow and virtual router forwarding plane 128 may request virtual router agent 104 to install a flow table entry in the flow table for the new packet flow. This may be referred to as "slow-path" packet processing for initial packets of packet flows and is represented in FIG. 3 by slow path 140.

In this example, virtual router agent 104 may be a user space 111 process executed by computing device 100. Virtual router agent 104 includes configuration data 134, virtual routing and forwarding instances configurations 136 ("VRFs 136"), and policy table 138 ("policies 138"). Virtual router agent 104 exchanges control information with one or more virtual network controllers (e.g., VNC 22 of FIGS. 1-2). Control information may include, virtual network routes, low-level configuration state such as routing instances and forwarding policy for installation to configuration data 134, VRFs 136, and policies 138. Virtual router agent 104 may also report analytics state, install forwarding state to FIBs 124 of virtual router forwarding plane 128, discover VMs 110 and attributes thereof. As noted above, virtual router agent 104 further applies slow-path packet processing for the first (initial) packet of each new flow traversing virtual router forwarding plane 128 and installs corresponding flow entries to flow tables 126 for the new flows for fast path processing by virtual router forwarding plane 128 for subsequent packets of the flows.

NIC 106B includes a segmentation module 115 configured to offload, from virtual router 120, at least a portion of network stack functions for transmitting packets. As described herein, although segmentation module 115 may not support network tunnels, virtual router 120 leverages segmentation module 115 for offloading segmentation of outbound packets transmitted by VMs 110 even though each outbound packet may need to be segmented and encapsulated as inner packets within multiple tunnel packets having properly formed headers. That is, NIC 106B may represent a conventional NIC in that the techniques applied by virtual router 120 for segmentation offload as described herein may be used with a NIC 106B having conventional segmentation offload capabilities that do not extend to or otherwise natively support segmentation offload in the context of network virtualization. Segmentation module 115 is combination of hardware and software of NIC 106B and configured to apply Large Segment Offload (LSO) to receive a chunk of data from virtual router 120, split the chunk of data into one or more smaller segments, and encapsulate the smaller segments with headers that appropriately describe the smaller segments for reassembly at a receiver device. The headers also enable switch fabric 14 to switch the encapsulated segments as tunnel packets to the receiver device.

When applied in the context of Transmission Control Protocol over IP (TCP/IP), segmentation module 115 may apply TCP Segmentation Offload (TSO). A TCP segment consists of a segment header and a data section. Upon receiving a data chunk and a header template for the encapsulating layers, which may include TCP, IP, and data link protocol (e.g., Ethernet) headers, segmentation module 115 divides at least a portion of the data chunk into equal-sized segments. Segmentation module 115 may receive the segment size with which to generate the equal-sized segments as parameters. In some cases, the size is the maximum segment size (MSS) for the TCP session (the MSS does not include the TCP header). Segmentation module 115 uses the header template to generate corresponding packets for each of the equal-sized segments, which NIC 106B outputs to the network. Each of the packets includes at least a tunnel header, inner header, and a TCP segment having a payload and a TCP header that describes the payload, including the correct sequence number. In some cases, the data chunk received by segmentation module 115 is a TCP segment, and segmentation module 115 accordingly splits the TCP segment data section into equal-sized segments and uses the TCP header to generate TCP headers for each of the segments in order to form multiple TCP segments for encapsulation by the IP and data link protocol headers.

In accordance with techniques described herein, virtual router 120 arranges inputs to segmentation module 115 to offload to NIC 106B the respective segmentation of a given inner packet, received by virtual router 120 from VMs 110, to generate a plurality of tunnel packets switchable by switch fabric 14 to a destination and that, in the aggregate, encapsulate the data payload of the inner packet. In the illustrated example, to offload segmentation in this way, the virtual router forwarding plane 128 of virtual router 120 receives an inner packet 101 from VM 110A and determines a tunnel header for the inner packet 101 based on routing instance 122A associated with VM 110A. That is, virtual router forwarding plane 128 uses FIB 124A and/or flow table 126A to determine an outer IP header for the inner packet 101 and also determines the virtual network identifier associated with routing instance 122A for a tunnel encapsulation header that is also part of the tunnel header. Although described as an "inner packet" because it will be encapsulated in many cases by virtual router 120 for output on the physical network, inner packet 101 may represent an IPv4 packet having an IPv4 header having source and destination address information associated with the virtual network for VM 110A as well as a payload, but without yet being encapsulated by an outer or tunnel header.

The virtual router forwarding plane 128 may provide the payload 105 of inner packet 101 (which may be a TCP segment) to segmentation module 115 via Eth1 114B. Virtual router forwarding plane 128 may also provide, in header template 103 via Eth1 114B, the inner header of the inner packet 101 as an L3 header and the full tunnel header as an L2 header via Eth1 114B to segmentation module 115. The full tunnel header may in some examples also include an L2 (e.g., MAC) header for an L3 next hop from computing device 100 to the outer IP header destination. In this way, virtual router forwarding plane 128 overloads or spoofs the segmentation module 115 into treating the full tunnel header as an L2 header for the segmented packets. Provision from virtual router 120 to segmentation module 115 may be made using system bus 142 via a reference to a location in memory 144, for instance, by invoking a procedure of an interface for NIC 106B that accepts header template 103 and payload 105.

In response, the segmentation module 115 splits the payload 105 of inner packet 101 into multiple TCP segments each having a TCP header that describes the corresponding segment. Segmentation module 115 applies the header template 103 to each of the multiple TCP segments to generate a plurality of tunnel packets 109. Because header template 103 includes the full tunnel header including outer IP header and the tunnel encapsulation header for the tunneling protocol, each of tunnel packets 109 includes an identical tunnel header for L2/L3 forwarding via switch fabric 14 and to identify a virtual network at the virtual router of the receiving device. NIC 106B outputs the tunnel packets 109 to switch fabric 14, which forwards the tunnel packets 109 to the destination computing device specified by the outer IP header destination address.

In this way, virtual router 120 offloads at least a portion of the segmentation of the inner packet 101 from cores 108 to NIC 106B, which generates the tunnel packets 109 without recourse to specialized programming or configuration for the segmentation module 115. That is, virtual router 120 arranges the inputs to NIC 106B via Eth1 114B in such a way as to cause the segmentation module 115 to treat a full tunnel header as an L2 header for tunnel packets 109. Moreover, although described primarily with respect to TCP, the segmentation offload techniques may be similarly applied to other transport-layer/L4 protocols, such as TCPv6, User Datagram Protocol, and Datagram Congestion Control Protocol (DCCP).

Figure 4:
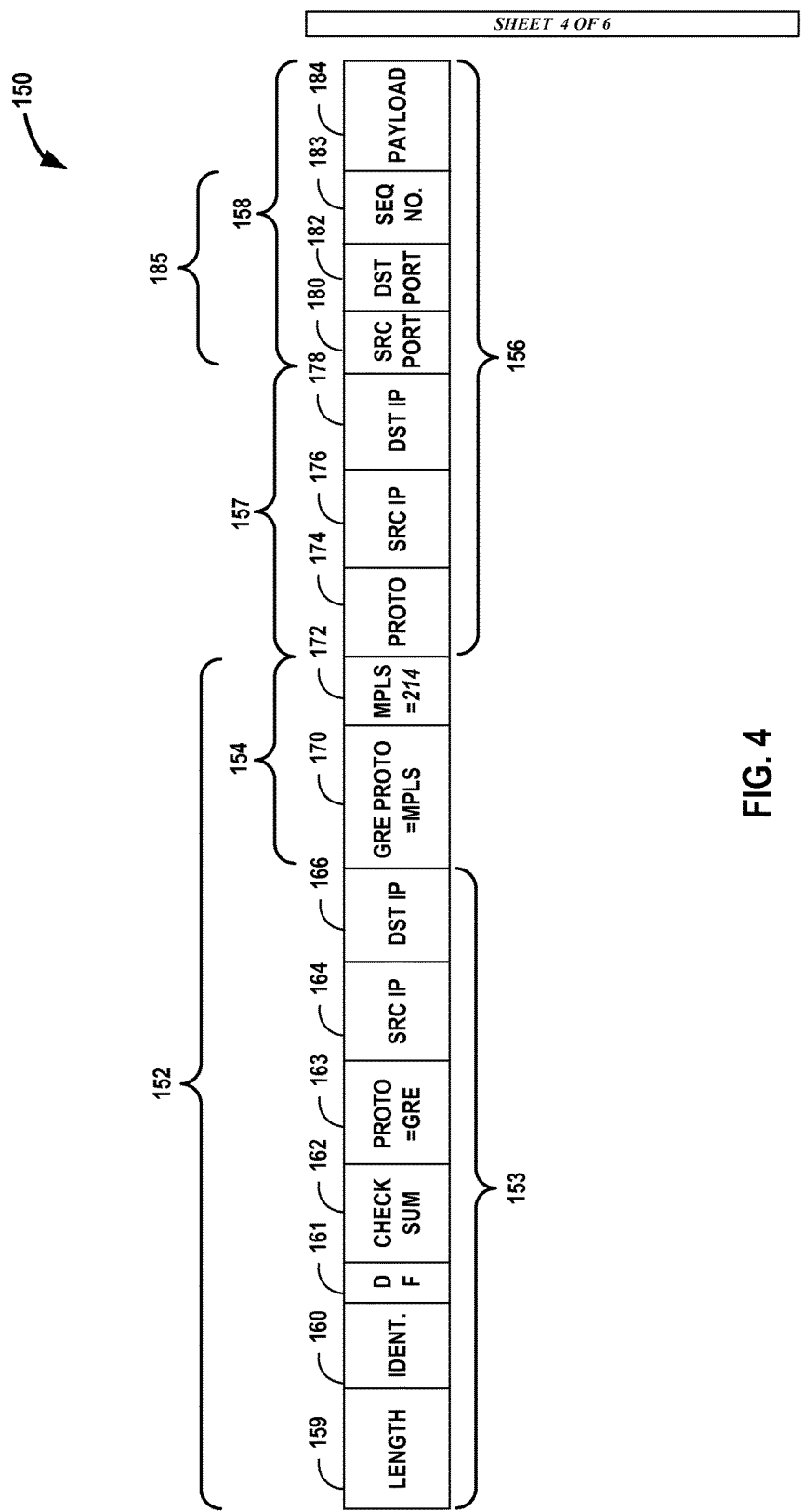
FIG. 4 is a block diagram illustrating, in detail, an example tunnel packet that may be generated by a computing device according to segmentation offload techniques described in this disclosure.

FIG. 4 is a block diagram illustrating, in detail, an example tunnel packet that may be generated by a computing device according to segmentation offload techniques described in this disclosure. For simplicity and ease of illustration, tunnel packet 150 does not illustrate each and every field of a typical tunnel packet but is offered to highlight the techniques described herein. In addition, various implementations may include tunnel packet fields in various orderings. "Outer" or "tunnel" packet 150 includes "outer" or "tunnel" header 152, tunnel encapsulation 154, and inner packet 156. Outer header 152 may include a total length ("length") field 159, identification ("ident.") field 160, do not fragment or Don't Fragment ("DF") field/flag 161, header checksum ("checksum") field 162, protocol ("proto") field 163 having a value in this example that indicates the Generic Route Encapsulation (GRE) protocol (a value of 47 as defined by the Internet Assigned Numbers Authority (IANA)), and public (i.e., switchable by the underling physical network for a virtual network associated with inner packet 156) IP address information in the form of source IP address field 164 and destination IP address field 166. Protocol field 163 in this example indicates tunnel packet 150 uses GRE tunnel encapsulation, but other forms of tunnel encapsulation may be used in other cases, including IPinIP, NVGRE, VxLAN, and MPLS, for instance.

Tunnel header 152 also includes tunnel encapsulation 154, which in this example includes GRE protocol field 170 to specify the GRE protocol (here, MPLS for MPLSoGRE) and MPLS label field 172 to specify the MPLS label value (here, 214). Other tunnel encapsulation protocols may be used in various examples. The MPLS label field 172 value is an example of a virtual network identifier and may be associated in a virtual router (e.g., virtual router 120 of computing device 100 of FIG. 3) with a routing instance for a virtual network, such as one of routing instances 122 of FIG. 3.

Inner packet 156 includes inner header 157 and TCP segment 158. Inner header 157 may include protocol field 174 as well as private (i.e., for a particular virtual routing and forwarding instance) IP address information in the form of source IP address field 176 and destination IP address field 178. Source port field 180 and destination port field 182 are example fields for a transport layer/L4 header that in this example is a TCP header 185. TCP header 185 also includes sequence number 183, which for a TCP SYN packet defines the sequence number of the actual first data byte. For a TCP packet that is not a SYN packet, the sequence number 183 value is the accumulated sequence number of the first data byte of the segment (i.e., the accumulated sequence number of the first data of payload 184).

Payload 184 may include application layer (layer 7 (L7)) and in some cases other L4-L7 information produced by or for consumption by a virtual machine for the virtual network. A combination of TCP header 185 and payload 184 may be referred to as TCP segment 158 (alternatively, "TCP packet 158"), and payload 184 may alternatively be referred to as a "TCP payload" or "TCP segment payload." The techniques of this disclosure are, however, applicable to other L4 protocols such as TCPv6, DCCP, and UDP. Payload 184 may include only a single segment of the full payload that provided in an inner packet and divided into multiple segments.

As described above with respect to FIG. 3, virtual router forwarding plane 128 may receive an inner packet and offload segmentation of the inner packet to segmentation module 115 to offload the generation of multiple tunnel packets that may conform to tunnel packet 150. The inner packet may include inner IP header 157 as well as the source port 180 and destination port 182 of TCP header 185 (the sequence number field value 183 changes on a per-TCP segment basis). To offload segmentation, upon receiving the inner packet from one of VMs 110, virtual router forwarding plane 128 determines a tunnel header 152 for the inner packet based on one of routing instances 122. The tunnel header 152 includes the outer IP header 153 determined from the routing instance 122 and also includes the tunnel encapsulation header 154 that specifies the type of encapsulation in GRE protocol field 170 and a virtual network identifier associated with the determined routing instance for the inner packet.

Virtual router forwarding plane 128 generates the tunnel header 152 to ensure that the tunnel header is identical for multiple TCP segments to be generated by segmentation offload 115. Because the checksum field 162 value varies according to the values of all fields of outer IP header 153, virtual router forwarding plane 128 ensures that (1) the length of the tunnel packet is identical such that the length field 159 value does not vary, (2) the identification field 160 of the outer IP header 153 is set to 0, and (3) the do not fragment field 161 is set to 1. Accordingly, the tunnel header 153 may be identical for each of the multiple TCP segments to be generated. Identification field 161 is in general used to support IP fragmentation and may be safely set to 0 for the tunnel header 152 for each tunnel packet because the do not fragment field 161 is also set to 1. Virtual router forwarding plane 128 also computes a checksum for outer IP header 153 and sets the value for checksum field 162 to the computed checksum. Checksum field 162 thus includes the checksum computed over outer IP header 153 (the computation does not include the tunnel packet 150 payload, i.e., tunnel encapsulation header 154 and inner packet 156).

The value for length field 159 may be set to reflect the MSS for the TCP connection, for cases in which the techniques are applied in the context of TSO. The MSS defines a size for payload 184 of TCP segment 158. The length field 159 specifies the size of the full tunnel packet 152. Accordingly, and using LENGTH( ) as a function to obtain a length for a given object, the length field 159 value may be the value of LENGTH(tunnel header 152)+LENGTH(inner IP header 157)+LENGTH(TCP header 185)+MSS. Again, not all fields of the various headers of tunnel packet 152 are show for ease of illustration purposes.

Upon determining tunnel header 152, virtual router forwarding plane 128 provides (1) the tunnel header 152 as a non-standard sized L2 (e.g., Ethernet) header, (2) the inner IP header 157 from the received inner packet as the L3 (e.g., IP) header, and (3) the inner packet payload (e.g., a TCP segment) for segmentation. Provision of these buffers/data structures may be made by invocation of an interface function for Eth1 114B, for instance, which takes pointers to the various buffers stored in a main memory. Segmentation module 115 segments the inner packet payload into a plurality of equal-sized segments and generates corresponding TCP headers with which to form a plurality of TCP segments. Segmentation module 115 additionally adds the tunnel header 152 and the inner IP header 157 to each of the plurality of TCP segments to generate a plurality of tunnel packets that conform, so far as tunnel header 152 and inner IP header 157, to tunnel packet 150. The respective TCP segments 158 of the plurality of tunnel packets may vary by payload 184 and sequence number 183, and may possibly vary by other fields in the inner IP header 157 and TCP header for the TCP segments 158.

In some examples, virtual router 120 implements path Maximum Transmission Unit (MTU) discovery (PMTUD) to determine the MTU for paths traversed by flows transmitted by computing device 100. Because virtual router forwarding plane 128 may set the do not fragment field 161 for the outer header 152, virtual router 120 may facilitate non-fragmentation of the tunnel packet 150 within an IP fabric of the data center 10 by directing VMs 110 from generating an inner packet 101 that has a size larger than the path MTU minus the size of the tunnel header 152. If the virtual router 120 receives an instance of an inner packet 101 having a Don't Fragment flag set, the virtual router 120 may return an Internet Control Message Protocol (ICMP) Type 3 ("Destination Unreachable") or ICMPv6 Type 2 ("Packet Too Big") message containing a next-hop MTU that is the path MTU minus the size of the tunnel header 152. As a result, the VM 110 that sent the inner packet 156 will reduce the size of the inner packet 101 to the path MTU minus the size of the tunnel header 152. Virtual router 120 may handle ICMP messages received from the IP fabric of the data center 10.

In some examples, virtual router 120 may facilitate outputting a number of TCP segments generated by segmentation module 115 equal to the number of TCP segments expected by the network stacks of VMs 110. This may ensure that IP identification field value for instances of inner packet 101 received from VMs 110 remain synchronized. To this end, virtual router 120 may implement TCP MSS adjust by snooping TCP SYN packets and, prior to forwarding the TCP SYN packets, reducing the MSS therein to account for a size of outer header 152.

Figure 5:
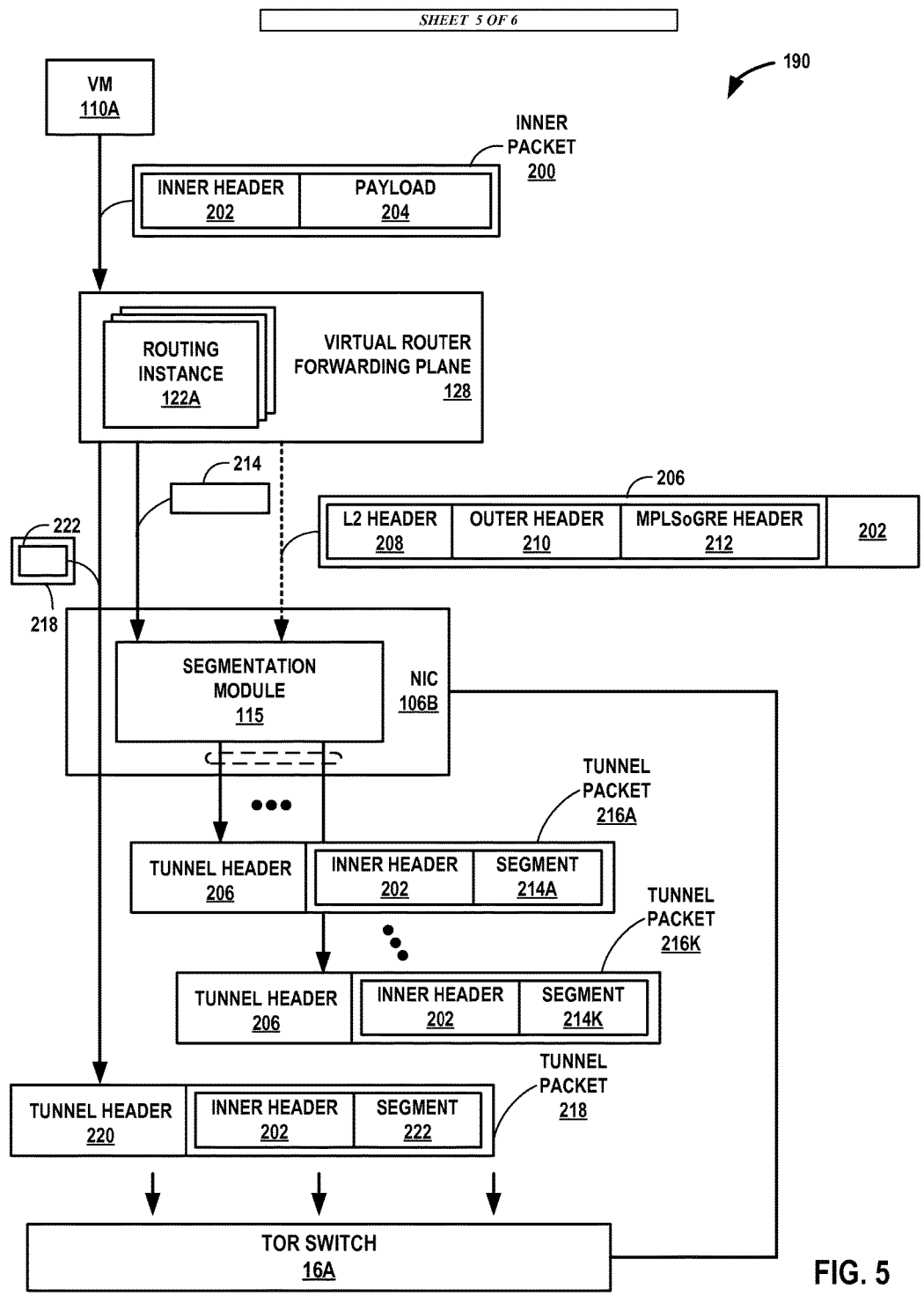
FIG. 5 is a block diagram illustrating example operations for segmenting an inner packet in accordance with techniques described in this disclosure.

FIG. 5 is a block diagram illustrating example operations for segmenting an inner packet in accordance with techniques described in this disclosure. Operations 190 are described for purposes of illustration with respect to components of computing device 100 of FIG. 3 and, moreover, in the context of an IPoE data center that employs MPLSoGRE tunneling. An application executing on virtual machine 110A generates application data, and the TCP/IP stack executing on virtual machine 110A generates and encapsulates a segment that virtual machine 110A provides to virtual router 120 as inner packet 200 (e.g., via tap interface 146A which is illustrated in FIG. 3). Inner packet 200 includes the segment as payload 204 and an inner IP header 202 ("inner header 202"). The segment may represent a TCP segment having a TCP header and a TCP payload. The TCP header may in this context alternatively be referred to as an inner TCP header.

VM 110A is associated in this example with routing instance 122A identified by a virtual network identifier that is an MPLS label. Virtual router forwarding plane 128 uses these associations with VM 110A to determine the virtual network identifier (i.e., the MPLS label in this context) for tunneling inner packet 200 and generates MPLSoGRE header 212 to include the MPLS label. MPLSoGRE header 212 may be an example of tunnel encapsulation header 154 of FIG. 4 with MPLS field 172 set to the MPLS label for routing instance 122A.

Virtual router forwarding plane 128 also queries routing instance 122A routing information to lookup a physical destination IP address for the inner packet 200. Using the physical destination IP address and a source IP address for computing device 100 on which virtual router 120 executes, virtual router forwarding plane 128 generates outer IP header 210 ("outer header 210"). Virtual router forwarding plane 128 may further obtain L2 header 208 for the outer header 210 destination IP address, which may include a MAC table lookup. Virtual router forwarding plane 128 generates, and provides to segmentation module 115, a template that may include tunnel header 206 having the L2 header 208 (optional in some examples), the outer IP header 210, and the MPLSoGRE header 212. The template may also include the inner IP header 202 and the inner TCP header for payload 204. As described above with respect to FIG. 4, virtual router forwarding plane 128 may set do not fragment and identification fields of the tunnel header 206 to 0 to prevent fragmentation.

In addition, virtual router forwarding plane 128 divides payload 204 into segment 214 and segment 222. Payload 204 has a size that is the length of inner packet 204 excluding the inner IP header 202, which according the IPv4 protocol may be ~64 KB, although smaller or larger payloads 204 may be used in various implementations. Virtual router forwarding plane 128 obtains segment 214 to have a size that is the largest multiple of the MSS for the transport-layer connection that is less than the size of payload 204. Segment 214 is a contiguous data of payload 204. Segmentation module 115 may, as a result and as described further below, generate equal-sized (i.e., MSS-sized) segments by dividing segment 214. Virtual router forwarding plane 128 also obtains segment 222 that is the remainder of payload 204 and is also contiguous data of payload 204. Segment 222 may be the first LENGTH(segment 222) bytes of payload 214 or the last LENGTH(segment 222) bytes of payload 214. The use of "obtain," herein, may refer to generating, copying, receiving, determining a pointer or other reference to a memory location, etc. Virtual router forwarding plane 128 may obtain the MSS from VM 110A in a TCP SYN packet initiating the transport-layer connection. The MSS and other flow state information may be stored to flow table 126A for routing instance 122A. In some instances, VM 110A (and other VMs 110 in other cases) provides the MSS with each instance of an inner packet such as inner packet 200, regardless of whether the segment therein includes a TCP SYN packet. Each of segments 222 and 214 may represent a TCP segment and include a TCP header describing the corresponding TCP payload therein with the correct sequence number for the initial byte of the TCP payload.

To offload further segmentation of inner packet 200, virtual router forwarding plane 128 provides segment 214 to segmentation module 115. In some examples, virtual router forwarding plane 128 may provide segment 214 along with tunnel header 206 and inner IP header 202 as a single packet or buffer. However, virtual router forwarding plane 128 provides tunnel header 206 to segmentation module 115 as if the full tunnel header 206 is an L2 header and inner IP header is an L3 header. Virtual router forwarding plane 128 may further provide the MSS for the transport-layer connection (stored, e.g., in flow table 126A) to segmentation module 115.

Using provided segment 214, tunnel header 206 and inner IP header 202, segmentation module 115 generates multiple tunnel packets 216A-216K (collectively, "tunnel packets 216"). Specifically, segmentation module 115 performs TCP segmentation with respect to segment 214 according to the MSS and the provided template including tunnel header 206 and inner IP header 202. Segmentation module 115 divides the segment 214 into K segments 214A-214K, where K*MSS is the largest multiple of MSS that is less than the size of payload 204. As a result, each of segments 214A-214K has an identical length of MSS, although virtual router forwarding plane 128 may provide a segment size that is other than MSS for the transport-layer connection in some cases. Each of segments 214A-214K may represent a TCP segment and thus include an appropriate TCP header with the correct sequence number for the TCP payload of the segment, in which case the length of each of segments 214A-214K is MSS plus the TCP header length (typically 20 bytes). Segmentation module 115 adds identical instances of tunnel header 206 and inner IP header 202 to each of segments 214A-214K to generate corresponding tunnel packets 216A-216K. In this way, virtual router forwarding plane 128 offloads segmentation of segment 214 to NIC 106B, which may subsequently output the tunnel packets 216A-216K for switching to the destination IP address specified in the outer IP header 210 of the tunnel headers 206.

For the segment 222 that includes the remaining portion of payload 204 not included in segment 214, virtual router forwarding plane 128 processes and forwards the segment 222 as if virtual router forwarding plane 128 received segment 222 from VM 110A as a payload of an inner packet having inner IP header 202. That is, virtual router forwarding plane 128 applies routing instance 122A to determine a tunnel header 220 based on inner IP header 202, generates tunnel packet 218 including the tunnel header 220, inner IP header 202, and the remainder segment 222. Tunnel header 220 may be different than tunnel header 206 given that the length of segment 222 will be different than the length of each of segments 214A-214K. Furthermore, tunnel header 220 may permit IP fragmentation.

As a result of the segmentation offload techniques described above, virtual router forwarding plane 128 may avoid generating K+1 segments and in some cases the attendant traversal of the TCP/IP stack that would otherwise be required were virtual router forwarding plane 128 to perform the full segmentation itself with respect to inner packet 200. Instead, the virtual router forwarding plane 128 may segment the inner packet 200 into just two segments. Because K can in some cases exceed 40, this may lead to resource usage reductions by the computing resources supporting the execution of virtual router 120.

In some examples, an interface for Eth1 114B (and therefore to NIC 106B) may substantively conform to the following example of a send call to a Linux or other Unix-style device driver represented in FIG. 3 as Eth1 114:

netdev_tx_t (*ndo_start_xmit) (struct sk_buff*skb, struct net_device*dev);

In the above function prototype that defines an example of a send (or "transmit") call of the Eth1 114B interface, skb is an sk_buff data structure that includes a reference to a packet buffer that stores a packet and dev may represent Eth1 114B for NIC 106B according to the Linux device model. The sk_buff data structure also includes, either directly or by reference, a segment size gso_size with which to segment the packet. Virtual router forwarding plane 128 may set the segment size variable to a non-zero value (e.g. the MSS for the transport-layer connection) to direct NIC 106B, by operation of segmentation module 115, to segment the packet. The sk_buff data structure also includes a reference to the various headers within the packet, including the IP header iphdr.

In the context of FIG. 5, as part of offloading segmentation of segment 214, virtual router forwarding plane 128 invokes the netdev_tx_t function to provide tunnel 206, inner IP header 202, and segment 214 as a packet stored to the packet buffer of skb for segmentation NIC 106B. Virtual router forwarding plane 128 may set iphdr to reference inner IP header 202 and gso_size to the MSS. As a result, NIC 106B by operation of segmentation module 115 segments segment 214 by gso_size as if tunnel header 206 is actually an L2 header rather than the full tunnel header for data center 10, for instance. NIC 106B then sends generated tunnel packets 216A-216K. The Virtual router forwarding plane 128 may further invoke the netdev_tx_t function to provide tunnel packet 218 as a packet stored to the packet buffer of skb and with gso_size set to 0 to NIC 106B, which sends the tunnel packet 218.

Figure 6:
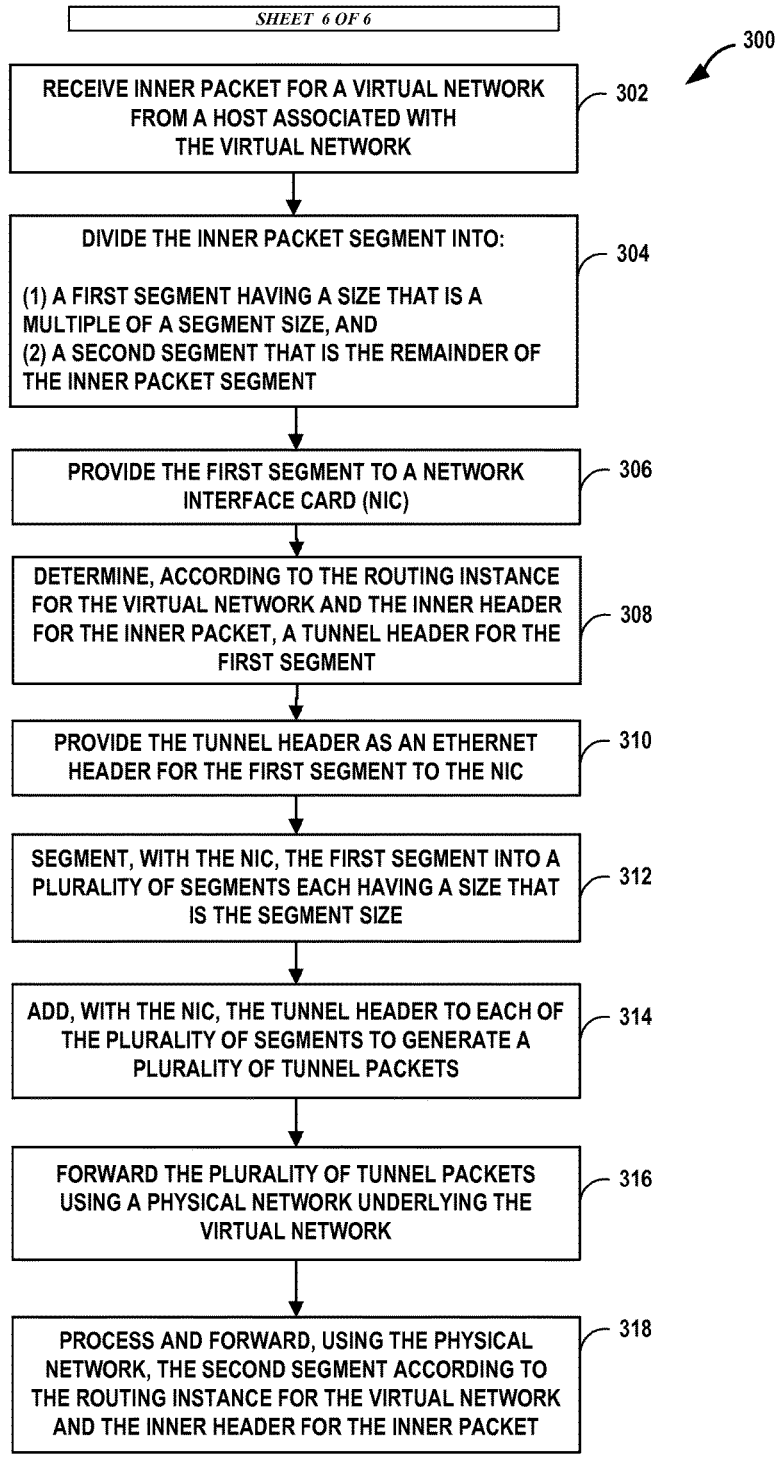
FIG. 6 is a flowchart illustrating an example mode of operation for a computing device that offloads segmentation of a packet for a virtual network to a network interface card, in accordance with techniques described in this disclosure.

An example data structure that may be referenced or otherwise included within s kb for use in segmentation offload, as described herein, is as follows:

struct skb_shared_info {
    atomic_t dataref;
    unsigned short nr_frags;
    unsigned short gso_size; /*segment size*/unsigned short gso_segs;
    unsigned short gso_type;
    _be32 ip6_frag_id;
    union skb_shared_tx tx_flags;
    struct sk_buff *frag_list;
    struct skb_shared_hwtstamps hwtstamps;
    skb_frag_t frags[MAX_SKB_FRAGS];
    void * destructor_arg;
};

FIG. 6 is a flowchart illustrating an example mode of operation for a computing device that offloads segmentation of a packet for a virtual network to a network interface card, in accordance with techniques described in this disclosure. Operation 300 is described with respect to computing device 100 of FIG. 3 but may be applied by virtual routers 30 executed by servers 12 of FIGS. 1-2 or by virtual routers executed by or included within TOR switches 16 or servers 12 as an insertable blade or module.

Computing device 100 receives an inner packet 101 from a virtual machine, in this instance a virtual machine 110A hosted by the computing device 100 (302). The virtual machine 110A is associated with a virtual network implemented in part by virtual router 120 of computing device 100. The virtual router forwarding plane 128 of the virtual router 120 of computing device 100 divides the segment or payload of the inner packet 101 into two segments: (1) a first segment having a size that is a multiple of a fixed segment size such as the MSS, and (2) a second segment that constitutes the remainder of the segment of the inner packet 101 (304). The first and second segments may be TCP segments.

Virtual router forwarding plane 128 offloads further segmentation of the first segment by providing the first segment to NIC 106B via Eth 114B (306). Virtual router forwarding plane 128 may use routing instance 122A associated with VM 110A (the source virtual machine for inner packet 101) and the inner header for the inner packet 101 to determine a tunnel header for the first segment according to the virtual network for routing instance 122A and VM 110A (308). Virtual router forwarding plane 128 additionally provides the tunnel header for the first segment as an Ethernet header via Eth 114B (310).

NIC 106B segments the first segment into a plurality of segments each having a size that is the fixed segment size (312) and adds a copy of the tunnel header to each of the plurality of segments to generate a plurality of tunnel packets (314). NIC 106B may in some cases apply TCP Segmentation Offload. NIC 106B forwards the plurality of tunnel packets along the physical network according to the tunnel headers (316). In addition, virtual router forwarding plane 128 may use routing instance 122A and the inner header for the inner packet 101 to determine a tunnel header for and forward, along the physical network coupled to NIC 106B, the second segment according to the virtual network (318). In this way, virtual router 120 divides the payload of inner packet 101 into two segments: a first segment offloaded by the virtual router 120 for further segmentation to NIC 106B, and a second segment that includes a remainder of the payload and is not offloaded for further segmentation.

The techniques described herein, including in the preceding any of sections, may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
receiving, by a virtual router for one or more virtual networks, an inner packet output by a virtual machine associated with a virtual network from the one or more virtual networks;
providing, by the virtual router to a physical network interface card for segmentation of the inner packet into a plurality of outbound tunnel packets, a first segment of a payload of the inner packet, the first segment having a first segment length that is a multiple of a common segment size for respective segments of the plurality of outbound tunnel packets;
determining, by the virtual router, an identical tunnel header for each of the plurality of outbound tunnel packets, wherein the identical tunnel header comprises an outer Internet Protocol header having a length field that indicates an identical length for the plurality of outbound tunnel packets; and
providing the identical tunnel header to the physical network interface card as a layer 2 (L2) header to cause the physical network interface card to generate and output, to a physical network underlying the virtual network, the plurality of outbound tunnel packets as L2 packets each including the identical tunnel header and a different layer 3 (L3) packet having a different segment from the inner packet.

2. The method of claim 1, further comprising:
determining, by the virtual router at least in part by using a routing instance associated with the virtual network, the identical tunnel header for each of the plurality of outbound tunnel packets.

3. The method of claim 1, further comprising:
separately determining, by the virtual router, a tunnel header for a second segment that is a remainder of the payload of the inner packet not including the first segment; and
forwarding, by the virtual router via the physical network interface card, an additional outbound tunnel packet including the second segment and the tunnel header for the second segment.

4. The method of claim 1, wherein the physical network interface card does not natively support segmentation of packets in a network virtualization context.

5. The method of claim 1,
wherein the plurality of outbound tunnel packets have an identical length, and
wherein the outer Internet Protocol header includes a Don't Fragment field indicating do not fragment, an identification field value set to 0, and a checksum field value.

6. The method of claim 1,
wherein the identical tunnel header includes a tunnel encapsulation header indicating a tunneling protocol for the virtual network.

7. The method of claim 1,
wherein the inner packet is associated with a Transmission Control Protocol (TCP) session initiated by the virtual machine,
wherein the segmentation comprises TCP segmentation offload, and
wherein a segment size for each of the plurality of outbound tunnel packets is a Maximum Segment Size (MSS) for the TCP session.

8. The method of claim 1,
wherein the physical network underlying the virtual network comprises a switch fabric comprising a plurality of switches interconnected to form a physical network that switches packets for the one or more virtual networks,
wherein a virtual network controller configures and manages the one or more virtual networks within the physical network, and
wherein each of a plurality of servers interconnected by the switch fabric comprises an operating environment executing one or more virtual machines in communication via the one or more virtual networks, and wherein the servers execute a set of virtual routers that extends the one or more virtual networks to the virtual machines,
wherein a server of the plurality of servers executes the virtual router and the virtual machine, and wherein the server includes the physical network interface card that is coupled to the physical network.

9. A network system comprising:
a switch fabric comprising a plurality of switches interconnected to form a physical network;
a virtual network controller device configured to configure and manage one or more virtual networks within the physical network; and
a plurality of servers interconnected by the switch fabric, wherein each of the servers comprises an operating environment executing one or more virtual machines in communication via the one or more virtual networks, and wherein the servers execute at least one virtual router configured to extend the one or more virtual networks to the operating environments of the virtual machines,
wherein a server of the plurality of servers executes a virtual router of the at least one virtual router,
wherein the virtual router is configured to receive an inner packet output by a virtual machine of the one or more virtual machines that is associated with a virtual network from the one or more virtual networks,
wherein the virtual router is configured to provide, to a physical network interface card of the server that executes the virtual router for segmentation of the inner packet into a plurality of outbound tunnel packets, a first segment of a payload of the inner packet, the first segment having a first segment length that is a multiple of a common segment size for respective segments of the plurality of outbound tunnel packets,
wherein the virtual router is configured to determine an identical tunnel header for each of the plurality of outbound tunnel packets, wherein the identical tunnel header comprises an outer Internet Protocol header having a length field that indicates an identical length for the plurality of outbound tunnel packets; and
wherein the virtual router is configured to provide the identical tunnel header to the physical network interface card as a layer 2 (L2) header to cause the physical network interface card to generate and output, to the physical network, the plurality of outbound tunnel packets as L2 packets each including the identical tunnel header and a different layer 3 (L3) packet having a different segment from the inner packet.

10. The network system of claim 9, wherein the virtual router is further configured to determine, at least in part by using a routing instance associated with the virtual network, the identical tunnel header for each of the plurality of outbound tunnel packets.

11. The network system of claim 9, wherein the virtual router is further configured to:
separately determine a tunnel header for a second segment that is a remainder of the payload of the inner packet not including the first segment; and
forward, via the physical network interface card, an additional outbound tunnel packet including the second segment and the tunnel header for the second segment.

12. The network system of claim 9, wherein the physical network interface card does not natively support offloading the segmentation of packets in a network virtualization context.

13. The network system of claim 9,
wherein the plurality of outbound tunnel packets have an identical length, and
wherein the outer Internet Protocol header includes a Don't Fragment field indicating do not fragment, an identification field value set to 0, and a checksum field value.

14. The network system of claim 9,
wherein the identical tunnel header includes a tunnel encapsulation header indicating a tunneling protocol for the virtual network.

15. The network system of claim 9,
wherein the inner packet is associated with a Transmission Control Protocol (TCP) session initiated by the virtual machine,
wherein the segmentation comprises TCP segmentation offload, and
wherein a segment size for each of the plurality of outbound tunnel packets is a Maximum Segment Size (MSS) for the TCP session.

16. A non-transitory computer-readable medium comprising instructions for causing one or more programmable processors of a computing device to:
receive, by a virtual router for one or more virtual networks, an inner packet output by a virtual machine associated with a virtual network from the one or more virtual networks; and
provide, by the virtual router to a physical network interface card of the computing device for segmentation of the inner packet into a plurality of outbound tunnel packets, a first segment of a payload of the inner packet, the first segment having a first segment length that is a multiple of a common segment size for respective segments of the plurality of outbound tunnel packets;

determine, by the virtual router, an identical tunnel header for each of the plurality of outbound tunnel packets, wherein the identical tunnel header comprises an outer Internet Protocol header having a length field that indicates an identical length for the plurality of outbound tunnel packets; and provide the identical tunnel header to the physical network interface card as a layer 2 (L2) header to cause the physical network interface card to generate and output, to a physical network underlying the virtual network, the plurality of outbound tunnel packets as L2 packets each including the identical tunnel header and a different layer 3 (L3) packet having a different segment from the inner packet.

* * * * *